Patented May 17, 1938

2,117,290

UNITED STATES PATENT OFFICE 2,117,290

META-XENYL PHOSPHORIC ACID DERIVATIVES

Edgar C. Britton and Shailer L. Bass, Midland, Mich., assignors to The Dow Chemical Company, Midland, Mich., a corporation of Michigan No Drawing. Application January 6, 1936, Serial No. 57,783

15 Claims. (Cl. 260—99.20)

This invention concerns certain new organo-derivatives of phosphoric acid and meta-phenyl-phenol. The characteristic diphenyl, or phenyl-phenyl, group, $C_6H_5.C_6H_4$—, as well as the phenyl-phenoxy group, $C_6H_5$—$C_6H_4$—O—, which are present in these compounds, are also known as the "xenyl" and "xenoxy" groups, respectively, which latter terms we prefer to use in this application to avoid confusion of nomenclature. Said new compounds have the general formula,

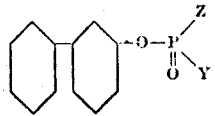

wherein Y and Z each represent halogen or an aryloxy group. The invention, then, consists in the group of new compounds comprising meta-xenyl phosphoric acid halides and triaryl-phosphates containing from one to three meta-xenyl groups.

The mixed triaryl-phosphates having the above general formula are prepared by reacting a phosphorus oxyhalide successively with meta-xenol or an alkali salt thereof and at least one other phenolic compound, e. g. phenol, alkyl phenol, halo-phenol, naphthol, guaiacol, para-xenol, ortho-xenol, etc., or the alkali metal salts thereof. The order in which the different phenolic compounds are reacted is immaterial, although we find it convenient first to react the phosphorus oxy-halide with the proportion of meta-xenol necessary to form a meta-xenyl phosphoric acid dihalide, or a di-(meta-xenyl) phosphoric acid monohalide, as desired, and thereafter to react such acid halide with a different phenolic compound to form the desired mixed triaryl-phosphate product. Tri-(meta-xenyl) phosphate is prepared by reacting sufficient meta-xenol with a phosphorus oxyhalide to form the desired product.

The above reactions are carried out by heating a mixture of the appropriate materials to a reaction temperature, preferably in the presence of a reaction catalyst such as metallic calcium, magnesium, or aluminum, a chloride of magnesium, aluminum, or iron, etc. The temperature of the reaction is, of course, dependent in any particular case upon the reactants employed, the relative proportions thereof, the presence or absence of a catalyst, etc. Since, however, the reaction is accompanied by an evolution of hydrogen halide when the phenols themselves are used, it is usually sufficient merely to heat the reaction mixture to a temperature at which hydrogen halide is evolved. The reactions are preferably carried out at the lowest convenient reaction temperature, usually below 200° C., since at higher temperatures by-product formation may occur to an objectionable extent.

In forming a mixed triaryl-phosphate the intermediate meta-xenyl phosphoric acid halide products may be separated as such, e. g. by fractionally distilling the reaction mixtures in which they are formed. However, we find it convenient, after formation of such intermediate acid halide, to add the desired quantity of a second phenolic compound, e. g. phenol, to the crude reaction mixture and to continue the reaction to form the triaryl-phosphate product before attempting any purification. By operating in such manner, the extra steps involved in separating the intermediate acid halide product are avoided.

Following completion of the heating step in the preparation of the triaryl-phosphates, air is preferably bubbled through the hot reaction mixture to remove hydrogen halide and other volatile impurities therefrom. The mixture is then fractionally distilled to separate the triaryl-phosphate product.

The following equations showing the preparation of (1) a meta-xenyl phosphoric acid dihalide, (2) a di-(meta-xenyl) phosphoric acid monohalide, (3) di-(meta-xenyl)-phenyl phosphate, and (4) tri-(meta-xenyl) phosphate are illustrative of the type of reactions involved in operating according to the procedure described above:

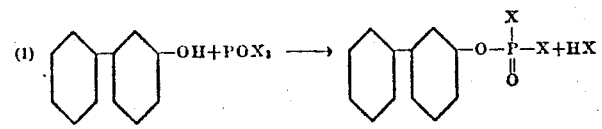

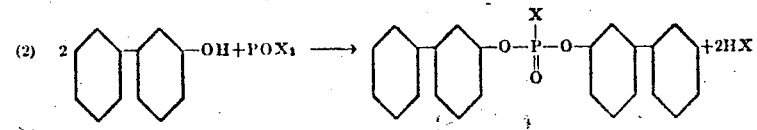

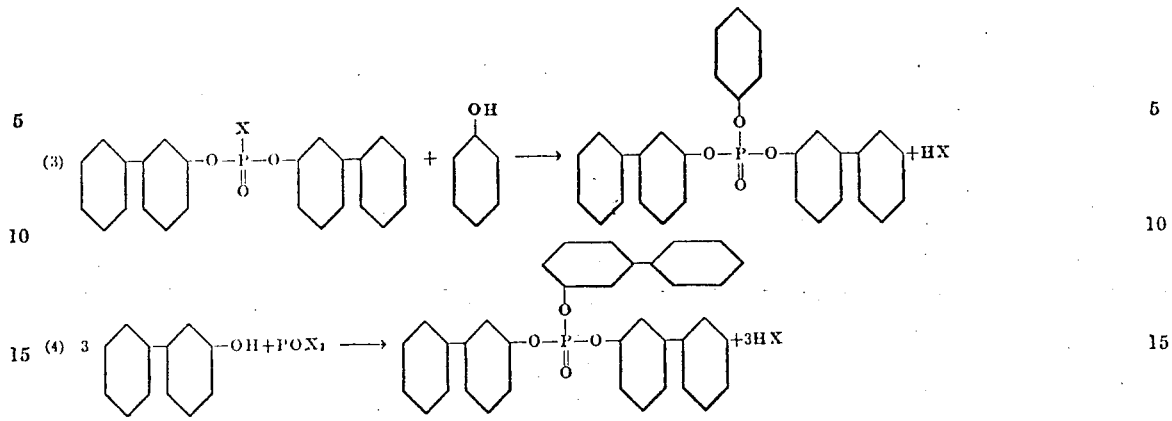

In the above equations X represents halogen.

Example 1

A mixture of 340 grams (2 moles) of pure meta-xenol and 1381 grams (9 moles) of phosphorus oxychloride was heated to a temperature between 72° and 103° C. for about 88 hours, i. e. until hydrogen chloride was no longer evolved from the mixture. The latter was then fractionally distilled, first at atmospheric pressure until the unreacted phosphorus oxychloride had been removed, and thereafter under vacuum. There was obtained 1033 grams (6.75 moles) of unreacted phosphorus oxychloride, 396 grams (1.38 moles) of meta-xenyl phosphoric acid dichloride, and 112.0 grams of higher boiling materials. Meta-xenyl phosphoric acid dichloride is a colorless liquid, boiling at approximately 218°–221° C. at 9 to 11 millimeters pressure, and having a specific gravity of 1.358 at 25° C./4° C., the formula being:

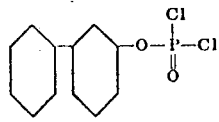

Example 2

A mixture of 510 grams (3 moles) of meta-xenol, 155 grams (1.01 moles) of phosphorus oxychloride, and 5 grams (0.05 moles) of anhydrous magnesium chloride was heated with stirring at temperatures gradually increasing from 95° to 175° C. for 6.5 hours. Hydrogen chloride and other volatile impurities were then blown out of the reacted mixture with air and said mixture was dissolved in 700 grams of orthodichlorobenzene. The resultant solution was washed successively with a dilute hydrochloric acid solution, a dilute aqueous sodium hydroxide solution, and water. It was then fractionally distilled under vacuum, whereby 473 grams (0.85 mole) of a tri-meta-xenyl phosphate product was separated. Tri-meta-xenyl phosphate is very soluble in alcohol, benzene, coal tar hydrocarbons, chlorinated hydrocarbons, and other lacquer solvents. It is a white crystalline solid melting at 84°–86° C., boiling at approximately 384° C. at 10 millimeters pressure, and having the formula:

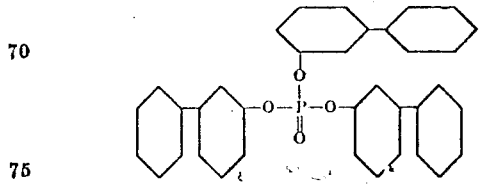

Example 3

A mixture of 143.5 grams (0.5 mole) of meta-xenyl phosphoric acid dichloride, 100 grams (1.06 moles) of phenol, and 1 gram of anhydrous magnesium chloride was heated with agitation to a temperature between 96° and 160° C. for 4.75 hours. The reacted mixture was blown with air to remove hydrogen chloride and other volatile impurities dissolved in 300 grams of orthodichlorobenzene, and washed successively with dilute hydrochloric acid, dilute aqueous sodium hydroxide solution, and water. The resulting solution was then fractionally distilled under vacuum, yielding 81.4 grams (0.2 mole) of a meta-xenyl-di-phenyl phosphate product. This compound is a colorless viscous liquid, boiling at 293° C. at 8 millimeters pressure, having a specific gravity of 1.202 at 60°/4° C., and the formula:

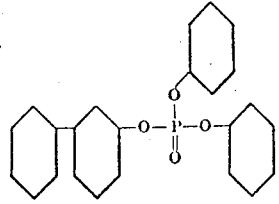

Example 4

A mixture of 105.5 grams (0.5 mole) of phenyl phosphoric acid dichloride, 175 grams (1.03 moles) of meta-xenol, and 1 gram of anhydrous magnesium chloride was heated with stirring at temperatures gradually increasing from 101° to 156° C. for 5.25 hours. Hydrogen chloride and other volatile impurities were then removed by blowing the mixture with air. The reacted mixture was dissolved in 250 grams of orthodichlorobenzene and the resultant solution washed successively with dilute hydrochloric acid, dilute aqueous sodium hydroxide solution, and water. This solution was fractionally distilled under vacuum, whereby 65.8 grams (0.14 mole) of a phenyl dimeta-xenyl phosphate product was separated. Said compound is a highly viscous liquid, having a boiling point of approximately 345° C. at 8 millimeters pressure, a specific gravity of 1.203 at 60°/4° C., and the formula:

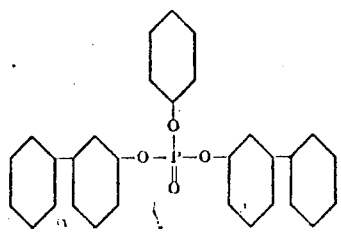

Example 5

90.5 grams (0.315 mole) of meta-xenyl phosphoric acid dichloride, 70.7 grams (0.655 mole) of ortho-cresol, and 1 gram of anhydrous magnesium chloride were reacted together at a temperature between 88° and 159° C. for 4.75 hours. Hydrogen chloride and other volatile impurities were then removed from the reaction mixture by blowing with air and the mixture was dissolved in 150 grams of orthodichlorobenzene, washed successively with dilute hydrochloric acid, dilute aqueous sodium hydroxide solution, and water, and fractionally distilled under vacuum. 95.8 grams (0.223 mole) of di-ortho-cresyl meta-xenyl phosphate was thereby obtained as a viscous liquid having a specific gravity of 1.172 at 60°/4° C., a boiling point of 284° to 298° C. at 5 millimeters pressure, and the formula;

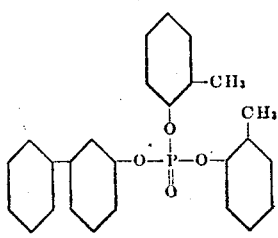

Example 6

A mixture of 97.7 grams (0.3 mole) of para-cyclohexyl phenyl phosphoric acid dichloride, 107 grams (0.63 mole) of meta-xenol, and 1.0 gram of anhydrous magnesium chloride was heated at a temperature of 102° to 156° C. for 7.75 hours. Hydrochloric acid gas and other volatile impurities were then vaporized out of the heated mixture with air. The reaction mixture was dissolved in 400 cubic centimeters of carbon tetrachloride and successively washed with dilute hydrochloric acid, dilute aqueous sodium hydroxide, and water. The resulting solution was then decolorized with animal charcoal and fractionally distilled to remove the carbon tetrachloride whereby 150.4 grams (0.269 mole) of a dimeta-xenyl para-cyclohexyl phenyl phosphate product was obtained as a residue. This product is a light brown, viscous liquid having a refractive index of 1.6002 at $$n\frac{60°C.}{D}$$

the specific gravity 1.165 at 60°/4° C., and probably the formula;

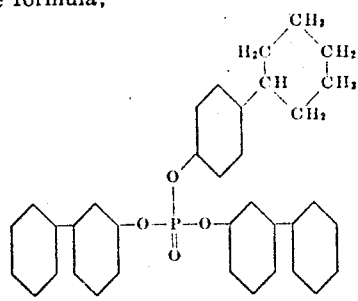

Example 7

1840 grams (12 moles) of phosphorous oxychloride, 432 grams (3 moles) of beta-naphthol, and 1 gram of magnesium chloride were reacted together at a temperature between 70° and 100° C. for 29 hours. The reaction mixture was then fractionally distilled at temperatures up to 108° C. at 15 millimeters pressure whereby 1422 grams (9.27 moles) of unreacted phosphorous oxychloride was separated. The residue, consisting of 705.4 grams of a beta-naphthyl phosphoric acid di-chloride product, was used in the preparation of the mixed naphthyl-meta-xenyl phosphates.

A mixture of 235 grams of the above beta-naphthyl phosphoric acid di-chloride product containing approximately 82 per cent of the pure di-halide, 265 grams (1.56 moles) of meta-xenol, and 1 gram of magnesium chloride was heated with agitation at temperatures gradually increasing from 77° to 160° C. for 8.1 hours. The reaction mixture was dissolved in 1 kilogram of carbon tetrachloride and washed successively with dilute aqueous hydrochloric acid, dilute aqueous sodium hydroxide, and water. The resulting solution was then decolorized with animal charcoal and fractionally distilled to remove the carbon tetrachloride whereby 376 grams of a di-(meta-xenyl)-beta-naphthyl phosphate product was obtained as a residue. This product is a red highly viscous oil having a refractive index of 1.6395 at $$n\frac{60°C.}{D}$$

the specific gravity 1.213 at 60°/4° C., and probably the formula;

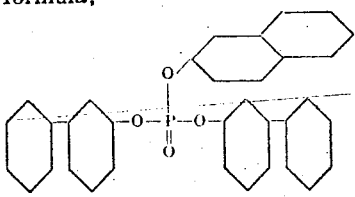

In a similar manner a meta-xenyl phosphoric acid di-halide may be reacted with another phenolic compound, e. g. cresol, etc., to form mixed acid halides such as meta-xenyl-cresyl phosphoric acid mono-halide. This compound in turn may be further reacted with an additional phenolic compound, e. g. phenol, etc., to form mixed triaryl-phosphate compounds such as (meta-xenyl)-cresyl-phenyl-phosphate in which the substituting aryl groups all differ one from the other.

Instead of employing phosphorus oxychloride as a reactant in preparing our products, we may employ phosphorus oxybromide, in which case our intermediate meta-xenyl-phosphoric acid halides are the bromides. For instance, phosphorus oxybromide may be reacted with 1 or 2 moles of meta-xenol to form meta-xenyl phosphoric acid dibromide and di-(meta-xenyl) phosphoric acid monobromide respectively. Either of these acid bromides may be reacted with any other phenolic compound or its salts, e. g. cresol, sodium tertiarybutyl-phenolate, etc., to form a triaryl-phosphate of the present class. The procedure involved in carrying out such reactions is similar to that hereinbefore described.

Our meta-xenyl phosphoric acid halides and triaryl-phosphate products containing the meta-xenyl group are, for the most part, viscous liquids or low melting solids. They are insoluble in water, soluble in most organic solvents, odorless, unaffected by light, and resistant to hydrolysis and oxidation. Upon prolonged heating with sodium hydroxide they break down to yield ortho-phosphoric acid and phenolic derivatives comprising meta-xenol. The acid halides are useful as intermediates for the preparation of a wide variety of organo-phosphates containing the meta-xenoxy radical, e. g. mixed triaryl-phosphates of the present class, etc. The new triaryl-phosphates herein disclosed are substantially non-flammable and are useful as plasticizers, fire-proofing agents, etc., in cellulose acetate and nitro-cellulose compositions, varnishes, etc.

Other modes of applying the principle of our invention may be employed instead of those explained, change being made as regards the method or compounds herein disclosed, provided the steps or compounds stated by any of the following claims or the equivalent of such stated steps or compounds be employed.

We therefore particularly point out and distinctly claim as our invention:—

1. In a method of preparing an organo-derivative of phosphoric acid having the general formula:

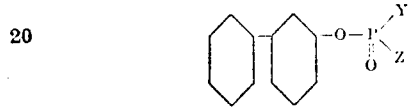

wherein Y and Z each represent a member of the group consisting of halogen and aryloxy groups, the step which consists in reacting a phosphorus oxyhalide with a compound selected from the class consisting of meta-xenol and alkali metal salts thereof.

2. In a method of preparing an organo-derivative of phosphoric acid having the general formula:

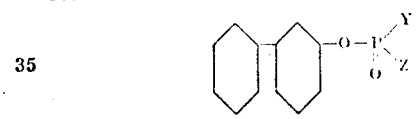

wherein Y and Z each represent a member of the group consisting of halogen and aryloxy groups, the step which consists in heating phosphorus oxychloride to a reaction temperature with meta-xenol in the presence of a catalyst selected from the class consisting of the chlorides of the metals magnesium, aluminum, and iron.

3. In a method of making a compound having the general formula:

wherein X represents halogen, the step which consists in heating a phosphorus oxyhalide to a reaction temperature with approximately a molecular equivalent of a compound selected from the class consisting of meta-xenol and alkali metal salts thereof.

4. In a method of making meta-xenyl phosphoric acid dichloride, the step which consists in heating phosphorus oxychloride to a reaction temperature with approximately a molecular equivalent of meta-xenol.

5. In a method of making a triaryl-phosphate having the general formula:

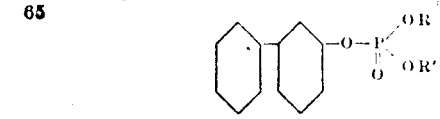

wherein R and R' represent aromatic hydrocarbon radicals, the steps which consist in heating a phosphorus oxyhalide to a reaction temperature with not more than twice its molecular equivalent of a compound selected from the class consisting of meta-xenol and alkali metal salts thereof, to form a meta-xenyl phosphoric acid halide, and heating the latter to a reaction temperature with another phenolic compound to form a mixed triaryl-phosphate.

6. In a method of making a triaryl-phosphate having the general formula:

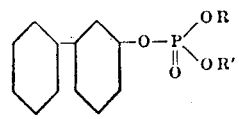

wherein R and R' represent aromatic hydrocarbon radicals, the step which consists in heating a meta-xenyl phosphoric acid halide to a reaction temperature with another phenolic compound to form a mixed triaryl-phosphate.

7. In a method of making a triaryl-phosphate having the general formula:

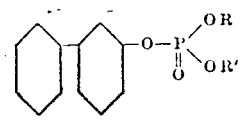

wherein R and R' represent aromatic hydrocarbon radicals, the step which consists in heating an aryl phosphoric acid halide to a reaction temperature with meta-xenol to form a mixed triaryl-phosphate.

8. In a method of making tri-meta-xenyl phosphate, the steps which consist in heating phosphorus oxychloride to a reaction temperature with approximately three molecular equivalents of meta-xenol.

9. In a method of making meta-xenyl-di-phenyl phosphate, the step which consists in heating meta-xenyl phosphoric acid dichloride to a reaction temperature with approximately two molecular equivalents of phenol.

10. In a method of making meta-xenyl-di-(ortho-cresyl) phosphate, the step which consists in heating meta-xenyl phosphoric acid dichloride to a reaction temperature with approximately two molecular equivalents of ortho-cresol.

11. A liquid or low-melting organo-derivative of phosphoric acid having the general formula:

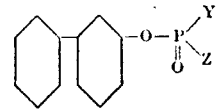

wherein Y and Z each represent a member of the group consisting of halogen and aryloxy groups.

12. A triaryl phosphate compound having the general formula:

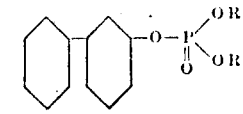

wherein R and R' represent aromatic hydrocarbon radicals.

13. Tri-meta-xenyl phosphate.
14. Meta-xenyl-di-phenyl phosphate.
15. Meta-xenyl-di(ortho-cresyl) phosphate.

EDGAR C. BRITTON.
SHAILER L. BASS.